(12) United States Patent
Grebing (10) Patent No.: US 12,318,059 B2
(45) Date of Patent: Jun. 3, 2025

(54) CLOSURE DEVICE, SYSTEM, PARTICLE COLLECTING ASSEMBLY, AND SUCTION DEVICE

(71) Applicant: Festool GmbH, Wendlingen (DE)

(72) Inventor: Gerhard Grebing, Nürtingen (DE)

(73) Assignee: Festool GmbH, Wendlingen (DE)

( * ) Notice: Subject to any disclaimer, the term of this patent is extended or adjusted under 35 U.S.C. 154(b) by 0 days.

(21) Appl. No.: 18/543,342

(22) Filed: Dec. 18, 2023

(65) Prior Publication Data

US 2024/0115093 A1    Apr. 11, 2024

Related U.S. Application Data

(63) Continuation of application No. 17/258,770, filed as application No. PCT/EP2019/068501 on Jul. 10, 2019, now Pat. No. 11,963,653.

(30) Foreign Application Priority Data

Jul. 13, 2018   (DE) ...................... 10 2018 211 712.8

(51) Int. Cl.
  *A47L 9/14*        (2006.01)
  *A47L 9/16*        (2006.01)
  (Continued)

(52) U.S. Cl.
  CPC ........... *A47L 9/1445* (2013.01); *A47L 9/1418* (2013.01); *A47L 9/1472* (2013.01); *A47L 9/1683* (2013.01);
  (Continued)

(58) Field of Classification Search
  CPC .... A47L 9/1445; A47L 9/1418; A47L 9/1472; A47L 9/1683
  See application file for complete search history.

(56) References Cited

U.S. PATENT DOCUMENTS

| 2002/0145010 A1 | 10/2002 | Ufheil et al. |
| 2007/0214755 A1 | 9/2007 | Corney et al. |
| 2016/0297580 A1 | 10/2016 | Batzel et al. |

FOREIGN PATENT DOCUMENTS

| CN | 101172025 | 5/2008 |
| CN | 103876686 | 6/2014 |

(Continued)

OTHER PUBLICATIONS

Office Action issued in corresponding Australian Patent Application No. 2019300195, Apr. 29, 2022, 8 pages.
(Continued)

*Primary Examiner* — Robert A Hopkins
(74) *Attorney, Agent, or Firm* — HSML P.C.

(57) ABSTRACT

A closure device for closing a particle capture volume, in particular a bag or a container, including an access element with an access element opening for providing an access to the particle capture volume, a closure slide which can be selectively displaced relative to the access element into a release position or into a closure position. In the release position the closure slide releases the access element opening and in the closure position closes the access element opening, and a locking mechanism for locking the closure slide in the closure position with respect to the access element, where the locking mechanism 6 for unlocking requires a defined unlocking element which is separate from the locking mechanism.

11 Claims, 5 Drawing Sheets

(51) Int. Cl.
      *B01D 29/13*       (2006.01)
      *B01D 29/23*       (2006.01)
      *B01D 29/27*       (2006.01)

(52) U.S. Cl.
      CPC ............. *B01D 29/13* (2013.01); *B01D 29/23* (2013.01); *B01D 29/27* (2013.01)

(56) References Cited

FOREIGN PATENT DOCUMENTS

| | | |
|---|---|---|
| CN | 203676996 | 7/2014 |
| DE | 8907662 | 10/1990 |
| DE | 3919256 | 12/1990 |
| DE | 9204479 | 5/1993 |
| DE | 29518166 | 1/1996 |
| DE | 4429342 | 2/1996 |
| DE | 29520610 | 2/1996 |
| DE | 60012359 | 8/2005 |
| EP | 891739 | 1/1999 |
| EP | 0 871 813 | 3/2003 |
| EP | 1229816 | 7/2004 |
| JP | 2004-527842 | 9/2004 |

OTHER PUBLICATIONS

English translation of the Office Action issued in corresponding Japanese Patent Application No. 2021-500803, May 20, 2022, 5 pages.

International Search Report and Written Opinion in corresponding PCT/EP2019/068501, dated Oct. 4, 2019.

German Search Report in corresponding German Application No. 102018211712.8 dated May 31, 2019.

Office Action issued in corresponding Chinese Patent Application No. 201980047044.0, May 28, 2021, 18 pages w/translation.

CLOSURE DEVICE, SYSTEM, PARTICLE COLLECTING ASSEMBLY, AND SUCTION DEVICE

CROSS-REFERENCE

This application is a continuation application of U.S. application Ser. No. 17/258,770, filed Jan. 8, 2021, which is a national stage of international application PCT/EP2019/068501, filed Jul. 10, 2019, which claims priority to German application DE 10 2018 211.712.8, filed Jul. 13, 2018, which are incorporated herein by reference.

The invention relates to a closure device for closing a particle capture volume, for example an inner volume of a bag or of a container, in particular of a disposal container. The bag for example is a disposal sack or a filter sack. The closure device comprises an access element with an access element opening for providing an access to the particle capture volume. The closure device further comprises a closure slide which can be selectively displaced relative to the access element into a release position or into a closure position. The closure slide releases the access element opening in the release position and closes the access element opening in the closure position.

BACKGROUND OF THE INVENTION

Such a closure device can be used for example to close a bag or a container for a suction apparatus, in particular vacuum cleaner. The closure device for example is fastened to the bag or to the container and, via the access element opening, provides an access to the inner volume of the bag or the container. In the release position of the closure slide, particles which are sucked by the suction apparatus, for example dust particles, can be transported into the bag or the container. The bag or the container can subsequently be closed by way of bringing the closure slide into the closure position.

An object lies in modifying the mentioned closure device such that the risk is reduced of particles which are located in the particle capture volume getting to the outside and contaminating the environment of the particle capture volume.

SUMMARY OF THE INVENTION

This object is achieved by the features which are specified in in the present disclosure. According to the invention, the closure device comprises a locking mechanism for locking the closure slide in the closure position with respect to the access element. For unlocking, the locking mechanism requires a specified unlocking element which is separate from the locking mechanism.

As a result, a special part—specifically the unlocking element—is required for unlocking the closure slide—and herewith for opening the closure device. Without this unlocking element, the closure slide cannot be unlocked and the closure device cannot be opened. The unlocking element in relation to the locking mechanism behaves for example as a key in relation to a lock. The unlocking element is separate from the locking mechanism, i.e. the unlocking element in particular is not a part of the locking mechanism, but is present additionally to the locking mechanism.

For opening the closure device, it is necessary to firstly provide the specified unlocking element which is separate from the locking mechanism. A user can only open the closure device after he has obtained the unlocking element. This reduces the risk of the closure device being inadvertently opened, by which means the risk of the contamination of the environment reduces.

Advantageous further developments are the subject-matter of the dependent claims.

According to a possible design, the locking mechanism comprises a through-hole which is arranged in the closure slide and a latching element which is arranged on the access element and which in the closure position engages into the through-hole and hence locks the closure slide in the closure position.

According to a further design, the through-hole and/or the latching element is preferably designed such that in the closure position, the latching element which engages into the through-hole cannot be actuated merely by hand, so that an unlocking element with a shape element, in particular a pin, which can be inserted into the through-hole, is necessary for unlocking the locking mechanism.

According to a further design, the closure device comprises the unlocking element, wherein the unlocking element is preferably a part which is provided separately from the closure slide and/or the access element.

According to a further design, the unlocking element is attachable to the closure slide and in the attached state is movable together with the closure slide relative to the access element.

According to a further design, the unlocking element comprises an unlocking element opening which in a state in which the unlocking element is attached to the closure slide and the closure slide is situated in the release position is located over the access element opening, so that the access element opening and the unlocking element opening together provide the access to the particle capture volume.

According to a further design, in a state in which the locking element is attached to the closure slide, the closure slide is exclusively displaceable between the release position and the closure position, wherein the closure device in each possible displacement position of the closure slide is situated in a state in which the access element opening is either closed or together with the unlocking element opening provides the access to the particle capture volume.

According to a further design, the closure device comprises a guide device which is designed to guide the unlocking element, in a state in which it is attached to the closure slide, relative to the access element and to permit a removal of the unlocking element only in the closure position.

According to a further design, in a state in which the unlocking element is attached to the closure slide and the closure slide is situated in the release position, the closure slide lies with a lateral end region on the access element, so that the closure slide cannot be removed from the unlocking element in this state.

According to a further design, the closure device comprises a blocking mechanism which in the release position of the closure slide prevents a displacing of the closure slide relative to the access element in the direction away from the closure position.

According to a further design, the unlocking element comprises on two opposite sides a respective shape element, in particular a pin, so that it can be simultaneously attached to two closure slides.

The invention further relates to a system, comprising a closure device which is described here, as a first closure device, wherein the access element is a first access element, the closure slide a first closure slide, the particle capture volume a first particle capture volume and the access element opening a first access element opening, wherein the unlocking element is attached to the first closure slide, characterised by a second closure device with a second access element which comprises a second access element opening which provides an access to a second particle capture volume, and with a second closure slide which is attached to the unlocking element and with which the second access element opening can be closed.

According to a possible design, the closure slides are coupled in movement to one another via the unlocking element, wherein the system in each displacement position of the closure slides is situated in a state in which each of the access element openings is either closed or together with the unlocking element opening provides the access to the respective particle capture volume.

The invention further relates to a particle capture arrangement comprising a closure device which is described here, as well as a bag, in particular a disposal sack or a filter sack, or a container, in particular a disposal container, wherein the closure device is attached to the bag or to the container.

The invention further relates to a suction apparatus for sucking particles, in particle dust, into a particle capture volume, comprising a system which is described here and/or a closure device which is described here.

BRIEF DESCRIPTION OF THE DRAWINGS

Details as well as exemplary embodiments are hereinafter explained with reference to the drawings. Herein there are shown in.

DETAILED DESCRIPTION OF THE INVENTION

FIGS. 1 to 4 show lateral sectioned views of a closure device 10 according to a first embodiment. The closure device 10 comprises an access element 1 and a closure slide 2. Additionally to this, an unlocking element 3 is shown in the FIGS. 1 to 4, said unlocking element however not being a necessary constituent of the closure device 10.

Figure 1:
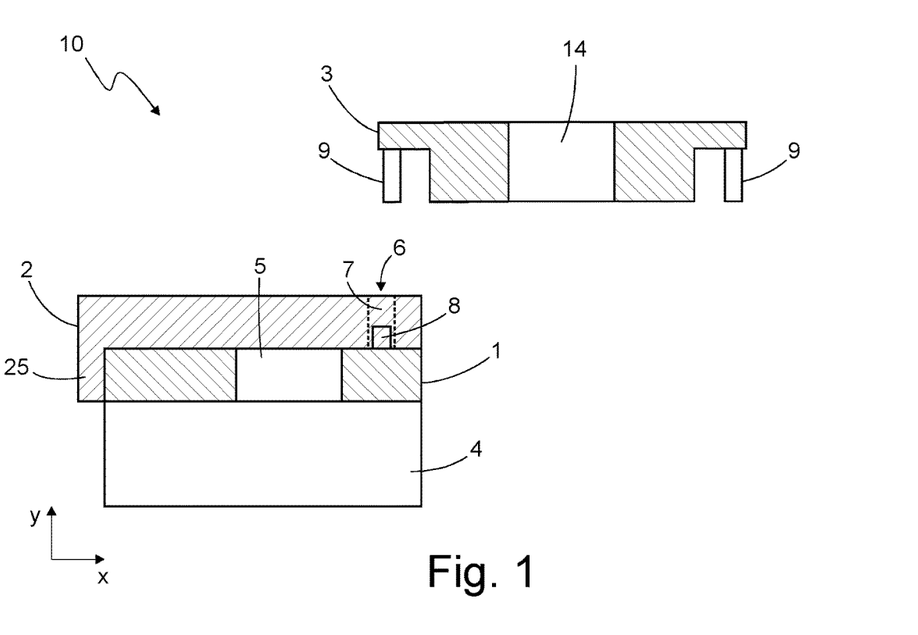
FIG. 1 a lateral sectioned view of a closure device according to a first embodiment, wherein the closure slide is situated in the closure position and an unlocking element is arranged separately from the closure slide, FIG. 2 a sectioned view of an access element, a closure slide and an unlocking element, according to the first embodiment, FIG. 3 a sectioned view of the closure device according to the first embodiment, wherein the unlocking element is attached to the closure slide and the closure slide is located in the closure position, FIG. 4 a sectioned view of the closure device according to the first embodiment, wherein the unlocking element is attached to the closure slide and the closure slide is situated in the release position, FIG. 5 a plan view of an access element, a closure slide and an unlocking element, according to a second embodiment, FIG. 6 a lateral sectioned view of the access element, of the closure slide and of the unlocking element, according to the second embodiment, FIG. 7 a front view of the access element, of the closure slide and of the unlocking element, according to the second embodiment, FIG. 8 a system with a first closure device in a closure position and with a second closure device in a release position and FIG. 9 the system with the first closure device in the release position and the second closure device the closure position.
Figure 2:
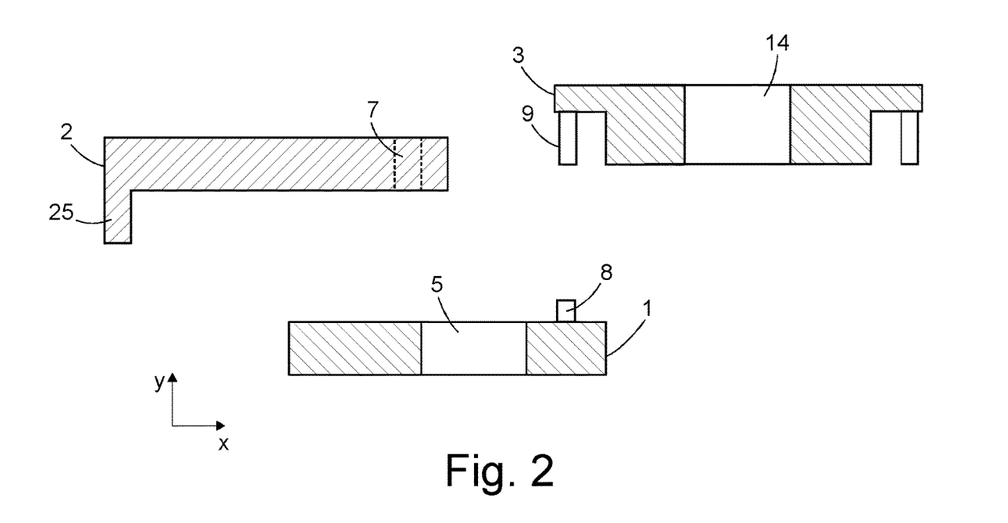

Furthermore, a particle capture volume 4 is shown in FIG. 1, said particle capture volume 4 by way of example representing the interior of a bag, in particular of a disposal sack or of a filter sack, of a container, in particular of a disposal container. For example, the closure device 10 can be fastened to a bag, in particular to a vacuum cleaner bag, or to a container, in order to close the inner volume of the bag or of the container. Such an arrangement of a bag or of a container and of a closure device which is attached thereto can also be denoted as a particle capture arrangement 4.

The access element 1 has an access element opening 5 for providing an access to the particle capture volume 4.

Figure 3:
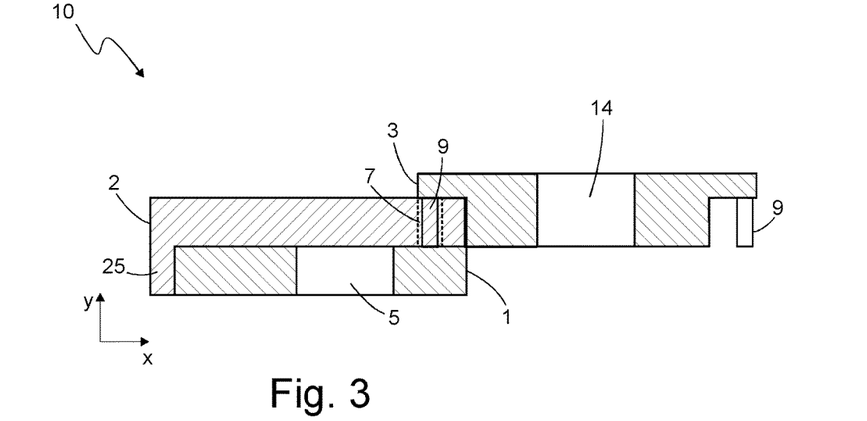
Figure 4:
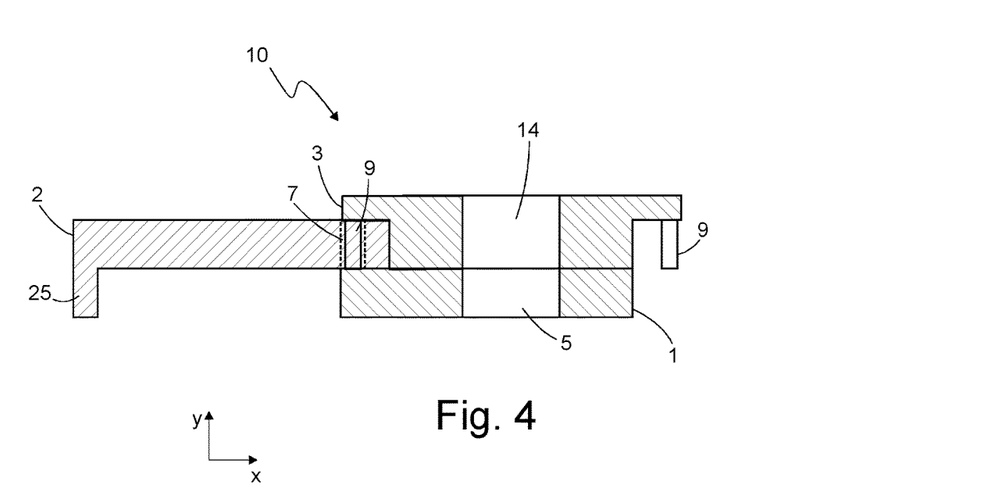

The closure slide 2 can be selectively brought into the release position or into the closure position relative to the access element 1. In the release position, the closure slide 2 releases the access element opening 5 and in the closure position the closure slide 2 closes the access element opening 5. An exemplary closure position is shown in FIG. 3 and an exemplary release position is shown in FIG. 4.

The closure device 10 further comprises a locking mechanism 6 for locking the closure slide 2 in the closure position with respect to the access element 1. The locking mechanism 6 for unlocking requires the unlocking element 3 which is provided additionally to the locking mechanism 6.

By providing the locking mechanism, as is already explained, the risk of an unintended opening of the closure device 10 is reduced. The unlocking element 3 is required in order to unlock the closure slide 2, so that it can be brought into the release position. A user must therefore first acquire the unlocking element 3 before he can open the closure device 10. This reduces the risk of the user inadvertently opening the closure device 10.

Further exemplary details and embodiments are discussed hereinafter. Herein, the spatial directions "x", "y", "z" which are drawn in the figures and which are aligned orthogonally to one another are referred to as the "x"-direction", the "y-direction" and the "z-direction".

It is to be pointed out that the actual aspect ratios of the individual components of the closure device 10—thus of the access element 1, of the closure slide 2 and/or of the unlocking element 3 can differ from the representations in the figures to the extent that the extension of each of the components in the x-direction and/or z-direction is a multiple, expediently at least a factor of 10, preferably at least a factor of 50 larger than the extension of the respective component in the y-direction.

The access element 1 by way of example is plate-shaped. The access element 1 has a lower side which faces the particle capture volume 4 and an upper side which faces the closure slide 2 (in the closure position). The lower side and the upper side are opposite to one another and by way of example are aligned normally to the y-direction. Expediently, the lower side and the upper side are the sides of the access element 1 which are the largest with regard to surface area.

The access element 1 comprises the access element opening 5. By way of example, the access element opening 5 is an opening from the upper side to the lower side of the access element 1. In a state in which the access element 1 is attached to a bag which encompasses the particle capture volume 4, in particular to a vacuum cleaner bag or to a container, the access opening 5 provides an access to the particle capture volume 4, expediently the only access to the particle capture volume 4. The bag or container can be attached, in particular bonded, for example to the lower side of the closure device 10. The bag or the container in particular is permanently attached to the closure device 10 with a positive fit and/or in a force-fitting manner, in particular by way of a chemical or physical connection.

The closure slide 2 is designed essentially plate-shaped. The closure slide 2 has a lower side which faces the access element 1 and an upper side which is aligned oppositely. The lower side and upper side are preferably the sides of the closure slide 2 which have the largest surface area. By way of example, the lower side and the upper side are aligned normally to the y-direction.

The closure slide 2 is mounted in a linearly movable manner relative to the access element 1, preferably in the x-direction. By way of example, the closure side 2 can be moved between the release position and the closure position by way of a linear displacement in the x-direction relative to the access element 1. In particular, a displacement of the closure slide 2 with respect to the access element 1 in this x-direction can be blocked by the locking mechanism.

Expediently, the closure slide 2 is mounted in a manner such that it cannot be moved relative to the access element 1 in the y-direction. By way of example, the closure slide 2 is mounted directly on the access element 1. For this, a suitable guide device (not shown in FIGS. 1 to 4) can be present. For example, a groove which runs in the x-direction can be present on the upper side of the access element 1 and a projection which engages into the groove can be present on the lower side of the closure slide 2 which faces the access element 1. Alternatively or additionally to this, a/the groove can also be present on the lower side of the closure slide 2 and a/the projection which engages into the groove can be present on the upper side of the access element 1. Furthermore, the mounting can also be provided by way of guide sections with L-shaped rails as will yet be explained hereinafter with reference to the FIGS. 5 to 7.

The closure slide 2 preferably lies directly on the access element 1, as is shown in FIG. 1. The closure slide 2 can be displaced in the x-direction and can thus be selectively displaced into the release position or into the closure position. In FIG. 1 (where the closure slide 2 is located in the closure position), the closure slide 2 must be displaced for example to the left, in order to bring it into the release position. Such a displacement in the direction from the closure position onto the release position is also denoted as a displacement in the direction of the release position or as a displacement in the direction away from the closure position. A displacement in the opposite direction (to the right in FIG. 1) is denoted as a displacement in the direction of the closure position or as a displacement in the direction away from the release position.

By way of example, the closure device 10 comprises a stop 25 which in the closure position of the closure slide 2 prevents a further displacement of the closure slide 2 in the direction away from the release position (thus to the right in FIG. 1). Expediently, the stop 25 is provided on the closure slide 2. By way of example, the stop 25 is a projection which projects downwards in the y-direction. The stop 25 is arranged on a lateral end region of the closure slide 2 in the x-direction.

In FIG. 1, the closure slide 2 is located in the closure position relative to the access element 1. In this closure position, the lower side of the closure slide 2 completely covers the access element opening 5, so that the access element opening 5 and therefore also the particle capture volume 4 is closed.

The closure slide 2 is locked relative to the access element 1 by way of the locking mechanism 6; i.e. the closure slide 2 cannot be moved relative to the access element 1 into the release position, thus in particular cannot be displaced in the x-direction. According to a preferred design, the closure slide cannot be moved at all—thus in no spatial direction—relative to the access element 1 when it is locked by the locking mechanism 6.

An actuation of the locking mechanism 6 is necessary for unlocking the closure slide 2. For this, a special unlocking element—for example the unlocking element 3 which is shown in FIG. 1—is required. In particular, this means that the locking mechanism 6 is designed in a manner such that it cannot be actuated purely by hand, thus that the closure slide 2 cannot be unlocked purely by hand.

By way of example, a purely manual actuation of the locking mechanism is prevented by way of a latching element 8 (which is to be actuated for unlocking the closure slide 2) being arranged in a manner such that in the closure position it cannot be reached purely by hand.

By way of example, the locking mechanism 6 comprises a through-hole 7 which is arranged in the closure slide 2, and the latching element 8 which is arranged on the access element. In the closure position, the latching element 8 engages into the through-hole 7 and in this manner locks the closure slide 2 in the closure position.

The through-hole 7 and/or the latching element 8 are designed in a manner such that in the closure position the latching element 8 which engages into the through-hole 7 cannot be actuated merely by hand. In particular, the length (i.e. the extension in the y-direction) of the through-hole 7 and/or of the latching element 8 and/or the diameter of the through-hole 7 is selected such that the latching element 8 cannot be reached and/or cannot be actuated merely by hand. For example, the diameter of the through-hole 7 is so small that a human finger does not fit in and the length of the latching element 8 (e.g. in the y-direction) is selected such that it does not project out of the through-hole 7.

The unlocking element 3 is therefore necessary for unlocking the locking mechanism 3. The unlocking element 3 comprises a shape element, in particular a pin 9, whose diameter is selected such that the shape element fits into the through-hole 7. The latching element 3 can be actuated by the shape element so that the closure slide 2 is unlocked and can be brought into the release position.

By way of example, the through-hole 7 runs from the upper side to the lower side of the closure slide 2. The through-hole 7 in particular runs in the y-direction. Expediently, the through-hole 7 has a round cross section. 7. The through-hole 7 is expediently arranged in a lateral end-region of the closure slide 2 in the x-direction.

The latching element 8 by way of example is arranged on the upper side of the access element 1. The latching element 8 projects upwards in the y-direction. Expediently, the latching element 8 is of elastic material and/or is elastically attached to the upper side of the access element 1, so that the upper side of the latching element 8 can be moved in the y-direction relative to the upper side of the access element 1 by way of actuation. Expediently, the latching element 8 can be pressed downwards in the y-direction to such an extent that it no longer engages into the through-hole 7, and that the closure slide 2 can be displaced in the x-direction and be brought into the release position. For example, the access element 1 is manufactured from an elastic material and as the latching element 8 comprises a latching tongue which projects upwards in the y-direction.

Expediently, the latching element 8 is designed in a manner such that when the closure slide 2 is brought into the closure position, it displaces into the through-hole 7 on its own accord, so that the closure slide 2 is automatically locked in the closure position.

Alternatively or additionally to the aforementioned design, for locking the closure slide, a first locking structure, in particular a locking projection, can be arranged on the closure slide, and a second locking structure, in particular a locking recess which in the closure position is engaged with the first locking structure can be arranged on the access element. Expediently, the closure slide comprises a spring element which presses the access element against the closure slide and thus effects the engagement of the two locking structures.

Expediently, the closure device 10 comprises the unlocking element 3. Preferably, the unlocking element 3 is a part which is provided separately from the closure slide 2 and/or from the access element 1, as this is shown in the figures. For fulfilling its basic function—specifically of unlocking the locking mechanism—the unlocking element 3 must comprise at least one element, for example the shape element, which can be inserted into the through-hole 7.

The unlocking element 3 is preferably designed to provide further functions beyond this basic function, as explained hereinafter.

The unlocking element 3 is essentially plate-shaped. The unlocking element 3 has an upper side and a lower side which expediently are the two sides of the unlocking element 3 which are the largest with regard to surface area. The subsequent explanations relate to the alignment of the unlocking element 3 which is shown in FIGS. 1 to 4 and with regard to which the upper side and/or the lower side are aligned normally to the y-direction.

The unlocking element 3 on at least one lateral end region in the x-direction comprises a downwardly projecting shape element, in particular a pin 9. By way of example, the unlocking element 3 on both lateral end regions in the x-direction each comprise at least one downwardly projecting shape element. As will be yet subsequently described in the context of FIGS. 8 and 9, such an unlocking element 3 which is provided on both sides with shape elements can advantageously be used together with two closure devices. In the example of FIGS. 1 to 4, such an unlocking element 3 which is provided with shape elements on both sides is however not necessarily required.

Preferably, the shape element, in particular the pin 9 is provided on the unlocking element 3 in a recess. The recess is designed in a manner such that it receives a lateral end region in the x-direction of the closure slide 2 when the shape element is inserted into the through hole 7. The shape element, which extends downwards from a projection which projects in the x-direction, is provided in this recess. Expediently, the lower side of the shape element is flush with the lower side of the unlocking element 3.

The unlocking element 3 is expediently attachable to the closure slide 2 and in the attached state can be moved together with the closure slide 2 relative to the access element 1. In particular, the unlocking element 3 in the attached state can be displaced in the x-direction relative to the access element 1.

For this, the unlocking element 3 expediently comprises a guide section which is compatible with the aforementioned guide device with which the closure slide 2 is mounted with respect to the access element 1. If a groove, a projection and/or a guide section for guiding the closure slide 2 with respect to the access element 1 is present for example on the closure slide 2, then the unlocking element 3 can comprise a corresponding groove, a projection and/or a guide section, so that the unlocking element 3 can be mounted in the same manner with respect to the access element 1 as the closure slide 2. Thus, a guide device can be provided, with which the unlocking element 3 in a state attached to the closure slide 2 is guided relative to the access element 1, in particular in the x-direction.

Expediently, this guide device is designed in a manner such that a removal of the unlocking element 3 is only possible in the closure position of the closure slide 2. This can be achieved for example by way of the closure device 10 being designed in a manner such that for bringing the closure slide 2 out of the closure position, a movement is necessary in which the unlocking element 3 (which is co-moved with the closure slide 2) is brought into a mounting relative to the access element 1, which mounting prevents a removal of the unlocking element 3 from the access element 1 and/or from the closure slide 2.

In the shown example, this is realised for example by way of a linear movement of the closure slide 2 (and of the unlocking element 3 which is attached thereto) in the x-direction being necessary for bringing the closure slide 2 out of the closure position. The movement in the x-direction in turn has the effect of a (not shown) guide section of the unlocking element 3 being brought into engagement with the access element 1, by which means a removal movement of the unlocking element 3—thus a movement in a direction, in which the shape element is pulled out of the through-hole 7—is blocked.

In a state in which it is attached to the closure slide 2, the unlocking element 3 is applied onto the closure slide 2 in the x-direction. Preferably, the lower side of the unlocking element 3 is flush with the lower side of the closure slide 2.

In a state, in which the closure slide 2 is not situated in the closure position, as is shown for example in FIG. 4, the lower side of the unlocking element 3 faces the upper side of the access element 1. Expediently, in this state the lower side of the unlocking element 3 lies directly on the upper side of the access element 1.

For attaching the unlocking element 3 onto the closure slide 2, the shape element is inserted into the through-hole 7 and the latching element 8 is pressed with the shape element so far downwards until the closure slide 2 can be moved to the release position. For this, preferably the unlocking element 3 is moved relative to the access element 1 in the y-direction. The closure slide 2 and the unlocking element 3 can then be displaced together relative to the access element 1 towards the release position. The unlocking element 3 is herein pushed onto the access element 1, so that a guide section which is arranged on the unlocking element 3 interacts with the access element 1, in order to provide a linear mounting of the unlocking element 3 with respect to the access element 1.

The removal of the unlocking element 3 can be effected by way of the closure slide 2 and the unlocking element 3 firstly being displaced in the direction of the closure position, until the closure slide 2 is located in the closure position. The unlocking element 3 is then moved upwards relative to the closure slide 2, so that the shape element is pulled out of the through-hole 7. The latching element 8 then engages into the through-hole 7, so that the closure slide 2 is locked relative to the access element 1.

Alternatively or additionally to the design described above, the unlocking element can also have a fastening interface with a latching hook, onto which fastening interface the closure slide 2 is fastenable by way of a pivoting movement.

The unlocking element 3 comprises an unlocking element opening 14 which lies over the access element opening 5 in a state in which the unlocking element 3 is attached to the closure slide 2 and the closure slide 2 is situated in the release position, so that the access element opening and the unlocking element opening 14 together provide the access to the particle capture volume 4. The unlocking element opening 14 is preferably an opening which runs from the upper side to the lower side of the unlocking element 3.

Expediently, a (not shown in the FIGS. 1 to 4) particle conduit, for example a (vacuum) flexible tube is connectable or connected on the unlocking element opening 14. For this purpose, a corresponding conduit connection, in particular a flexible tube connection, can be provided for example on the upper side of the unlocking element 3. The particles which are to be collected in the particle capture volume 4 can be fed via the particle conduit.

In a state in which the unlocking element 3 is attached to the closure slide 2, the closure slide 2 can preferably be displaced exclusively between the release position and the closure position, wherein the closure device 10 in each possible displacement position of the closure slide is situated in a state in which the access element opening 5 is either closed or together with the unlocking element opening 14 provides the access to the particle capture volume 4.

Expediently, the access element opening 5 is closed in each displacement position of the closure slide 2 except for the release position. This for example is realised by way of the sections of the lower sides of the closure slide 2 and of the unlocking element 3, said sections, which lie on the access element opening 5, being closed, thus providing no opening to the environment.

In this manner, the risk of a contamination of the environment with particles located in the volume capture space is further reduced, in particular for procedures in which the closure device 10 is being connected onto a particle conduit or is being separated from this.

For conventional closure devices for disposal sacks, in particular vacuum cleaner bags, it is typically necessary to firstly open the closure device before a particle conduit, for example a suction flexible tube, can be connected. Furthermore, it is typically necessary to remove the particle conduit before the (conventional) closure device can be closed. For the conventional closure devices, between the closed state and the state in which the particle conduit is connected, there is therefore a state in which the closure device is open with respect to the environment, so that particles from a particle capture volume can get to the outside through the closure device and can contaminate the environment.

With regard to the design of the closure device 10 which is shown in FIGS. 3 and 4, such a contamination of the environment is prevented by way of the access element opening 5 also being able to always remain closed even on attaching/removing a particle conduit. In particular this is achieved by way of the particle conduit not being attached directly to the access element opening 5 but instead to the unlocking element opening 14, so that an attachment/removal of the particle conduit can be effected in a state in which the access element opening 5 is closed with respect to the environment. The particle conduit is then connected to the access element opening 5 via the unlocking element opening 14 by way of the unlocking element opening 14 being pushed over the access element opening 5. The access element opening 5 here remains constantly closed with respect to the environment. The risk of a contamination of the environment can consequently be reduced.

FIG. 4 shows a state in which the unlocking element 3 is attached to the closure slide 2 and the closure slide 2 is situated in the release position. In this state, a lateral end region of the closure slide 2 lies on the access element 1 so that the closure slide 2 cannot be removed from the unlocking element 3 in this state.

In particular, the closure device 10 is designed such that in the release position of the closure slide 2, the lateral end region (in the x-direction) lies on a lateral end region (in the x-direction) of the access element 1, so that the closure slide 2 cannot be removed from the unlocking element 3 by way of a movement downwards. In this manner, it is ensured that the closure slide 2 always remains a part of the closure device 10 and that consequently the closure slide 2 must necessarily be brought into the closure position for removing the unlocking element 3.

The access element 1, the closure slide 2 and/or the unlocking element 3 are expediently each single-piece parts, in particular manufactured of one piece in the original shape. The access element 1, the closure slide 2 and/or the unlocking element 3 for example are injection moulded parts.

A closure device 20 according to a second embodiment is to be explained hereinafter with reference to the FIGS. 5, 6 and 7. The closure device 20 corresponds essentially to the closure device 10. Compared to the closure device 10, the closure device 20 is shown with further exemplary details, in particular a specific design of a guide device 17, a blocking mechanism 18 and a seal 24. Furthermore, with regard to the closure device 20, a certain number and arrangement of through-holes 7, latching elements 8 and shape elements, in particular pins 9 are shown purely by way of example. It is to be noted that any of these aspects can also be implemented with regard to the closure device 10.

The closure device 20 comprises an access element 11, a closure slide 12 and an unlocking element 12 which, apart from the subsequently explained additional features, can be designed respectively in accordance with the access element 1, the closure slide 2 and the unlocking element 3 which are discussed above, and can be put together just as these, in order to form the closure device 20.

Figure 5:
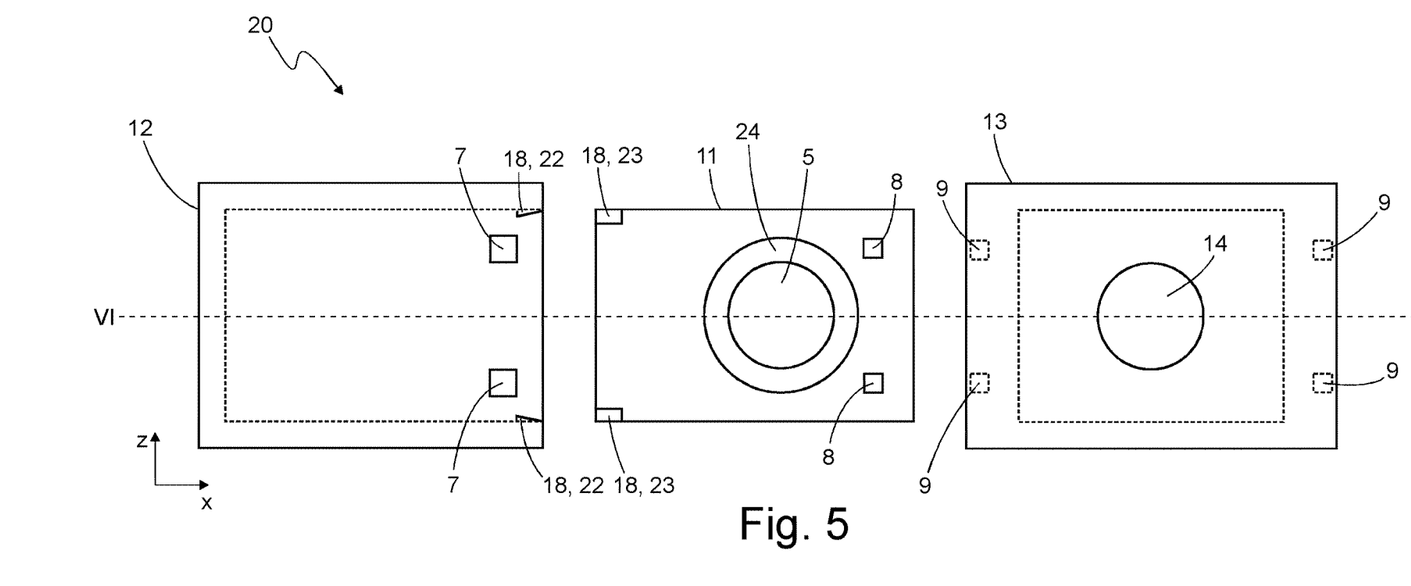

FIG. 5 shows a plan view upon the access element 11, the closure slide 12 and the unlocking element 13. FIG. 6 shows a sectioned view along the dashed line in FIG. 5, said line is provided with "VI". FIG. 7 shows a view from the front, wherein the access element 11, the closure slide 12 and the unlocking element 13 are arranged differently than in the FIGS. 5 and 6.

Figure 6:
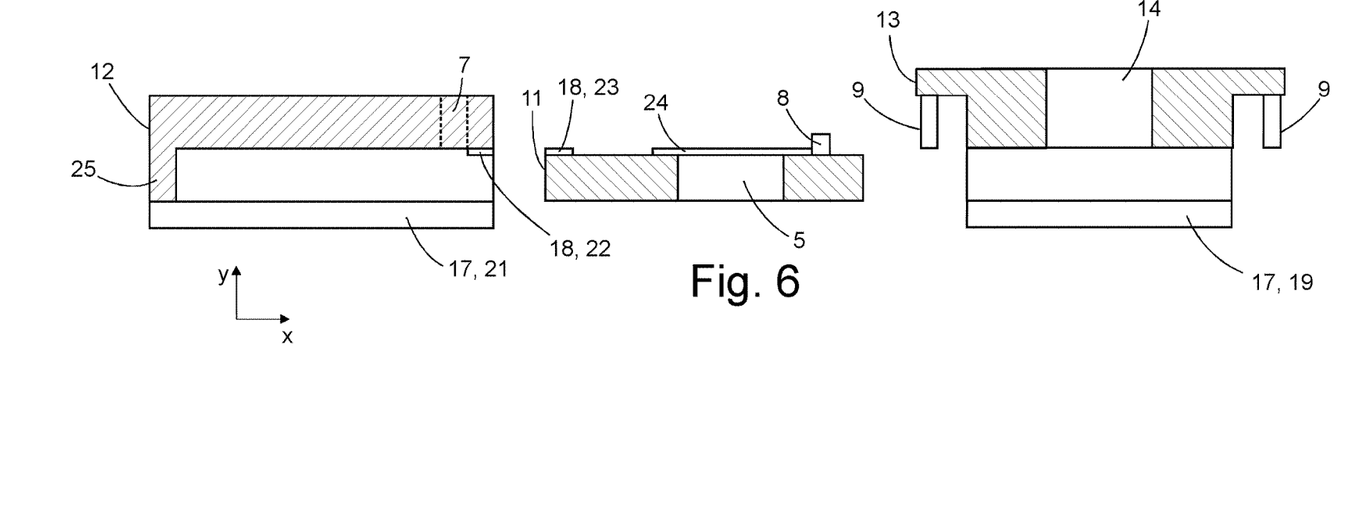
Figure 7:
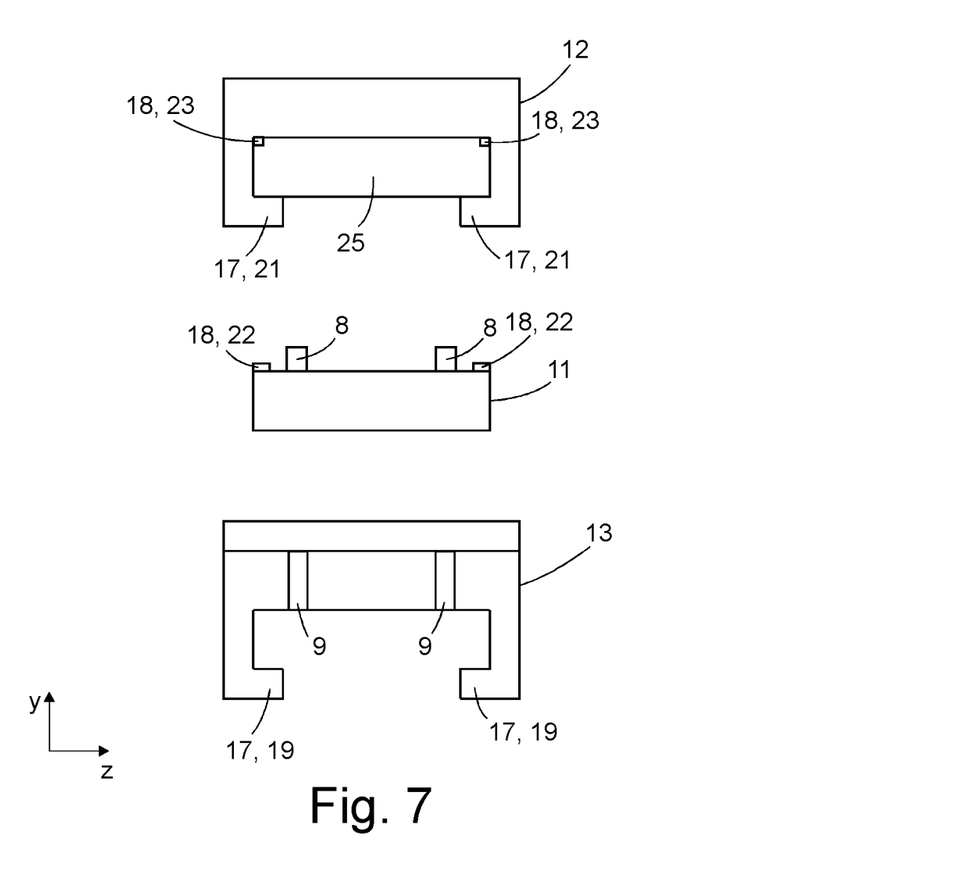

The guide device 17 of the closure device 20 is shown in the FIGS. 6 and 7. The guide device 17 is a specific design of the already explained guide device. The guide device 17 is designed to guide the closure slide 12 and/or the unlocking element 13 in a state in which it is attached to the closure slide 12, relative to the access element 11. Expediently, the guide device 17 is further designed to permit a removal of the unlocking element 13 from the closure slide 2 only in the closure position.

The guide device 17 comprises a guide section 21 which is arranged on the closure slide 2 and a guide section 19 which is arranged on the unlocking element 3. The guide sections 21 and 19 are designed corresponding to one another and each serve for receiving the access element 11 and guiding it in a linearly movable manner By way of example, the guide sections 21 and 19 each comprise L-shaped rails as is shown e.g. in FIG. 7. The L-shaped rails are each provided on the lower side of the closure slide 12 and/or of the unlocking element 13. The access element 1 can be inserted and linearly guided between the L-shaped rails and the lower side of the closure slide 12 and/or of the unlocking element 13. The guide device 17 in particular allows a movement in the x-direction and expediently blocks a movement in the y-direction.

Preferably, the guide section 19 is designed in a manner such that in a state in which the closure slide 12 is located in the closure position, there is not yet a blocking of a movement of the (attached to the closure slide 12) unlocking element 13 in the y-direction, so that the unlocking element 13 in this state can be removed from the closure slide 12. As is to be seen in FIG. 6, the guide section 19 is dimensioned accordingly and does not extend over the complete x-extension of the unlocking element 3.

The closure device 20 further comprises the blocking mechanism 18 which in the release positions of the closure slide 12 prevents a displacement of the closure slide 12 relative to the access element 11 in the direction away from the closure position. By way of this, it is ensured that the closure slide 12 continuously remains on the access element 11.

As is shown in FIGS. 5 and 6, such a blocking mechanism 18 can be realised for example by a closure slide projection 22 and an access element projection 23 which are arranged on the closure slide 12 or on the access element 11 in a manner such that they mutually serve as a stop and in the release position prevent a further movement of the closure slide 12 in the direction away from the closure position.

By way of example, two closure slide projections 22 and two access element projections 23 are provided, and these are expediently arranged on the lateral end regions in the x-direction of the access element 11 and of the closure slide 12. One can also provide more or fewer than two projections. Expediently, the closure slide projections 22 and/or the access element projections 23 are designed in a manner such that they can be led past one another in a movement direction of the closure slide 2 towards the closure position; i.e. when the closure slide 2 is pushed onto the access element 11 when putting together the closure device 20. This e.g. can be achieved by way of a suitable elastic design and/or sloped shape of the projections.

By way of example, the unlocking element 13 at two opposite sides comprises at least one respective shape element, in particular a pin 9, so that it can be simultaneously attached to two closure slides. Alternatively to this, the unlocking element 13 can also comprise at least one shape element, in particular a pin 9, at only one side.

Furthermore, the unlocking element 13 by way of example comprises two respective shape elements, in particular pins 9, at each side. The shape elements, in particular pins 9, of one side are expediently arranged distributed in the z-direction. The unlocking element can alternatively also comprise more or fewer shape elements, in particular pins 9 at one or each side.

Expediently, the through-holes 7 or the latching element 8 are provided in accordance with the shape elements, in particular pins 9, on the closure slide 12 and on the access element 11.

By way of example, the access element 11 further comprises a seal 25 which is arranged on the upper side around the access element opening 56.

Figure 8:
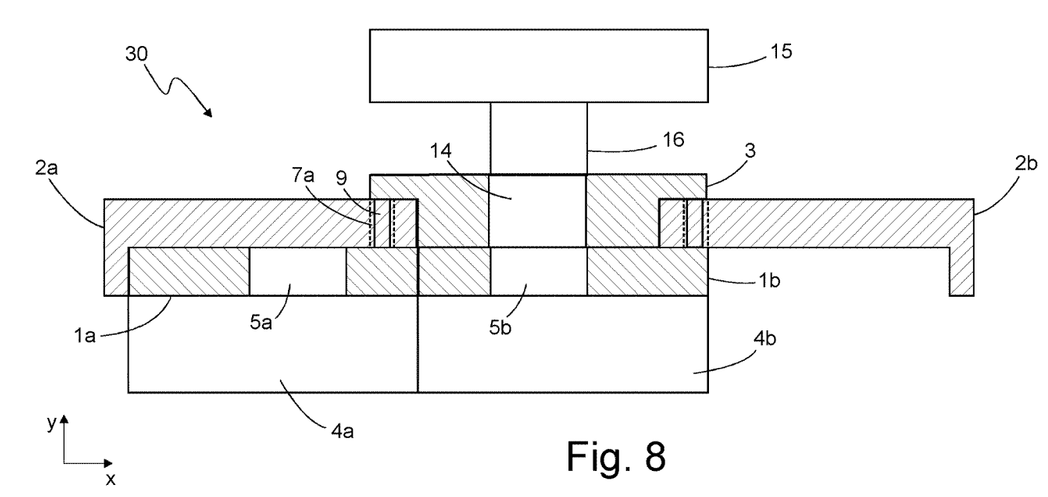
Figure 9:
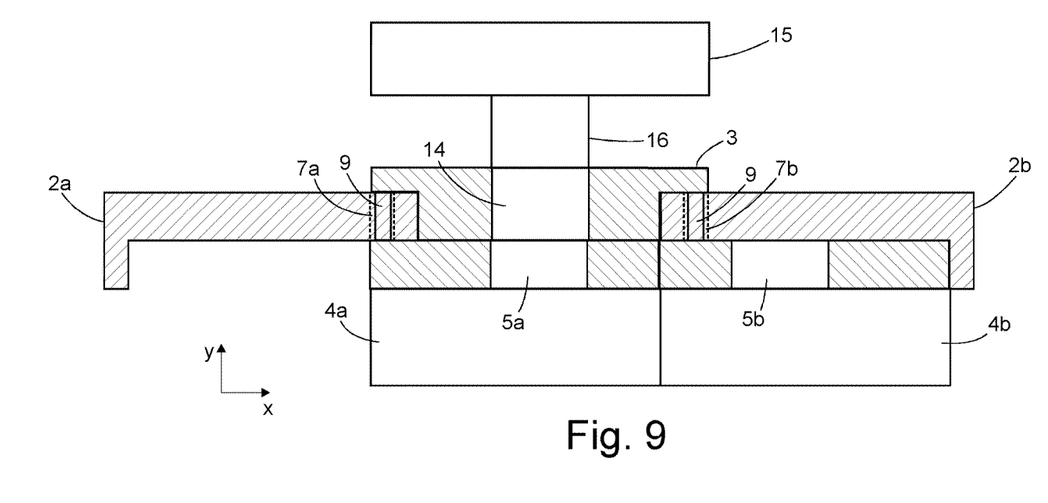

FIGS. 8 and 9 show an exemplary embodiment of a system 30. The system 30 comprises a closure device which is described above, for example the closure device 10 or the closure device 20, as a first closure device.

The first closure device comprises a first access element 1*a* with a first access element opening 5*a*, a first closure slide 2*a*, a first particle capture volume 4*a* and an unlocking element 3. The components of the first closure device are expediently designed just as the components of the closure device 10 or the closure device 20 which are explained above. The unlocking element 3 is attached to the first closure slide 2*a*.

The system 30 further comprises a second closure device with a second access element 1*b* which comprises a second access element opening 5*a*. The second access element opening 5*b* provides an access to a second particle capture volume 4*b*. The system 30 further comprises a second closure slide 2*b* which is attached to the unlocking element 3 and with which the second access element opening 5*b* can be closed. The components of the second closure device are expediently designed in accordance with the components of the closure device 10 or of the closure device 20 which are explained above.

Expediently, the unlocking element 3 is designed in a mirror-symmetric manner relative to a y-z plane which intersects the unlocking element 3. Preferably, the first closure device (without the unlocking element 3) is designed identically and/or mirror-symmetrically to the second closure device.

The closure slides 2*a*, 22*b* and the unlocking element 3 are preferably mechanically connected to one another such that together they form a first subassembly and are coupled in movement to one another. The connection of the closure slides 2*a*, 2*b* to the unlocking element 3 in particular is provided by way of the shape elements, in particular pins 9, of the unlocking element 3 being inserted into the through-holes 7 of the closure slides 2*a*, 2*b*. The closure slides 2*a*, 2*b* and the unlocking element 3 are applied onto one another in the x-direction, wherein in the x-direction one of the closure slides 2*a*, 2*b* is arranged on each side of the unlocking element. The first access element 1*a* and the second access element 1*b* are expediently also connected to one another and form a second subassembly.

The first subassembly can be linearly displaced in the x-direction relative to the second subassembly. The system 30 can therefore be selectively brought into one of the states which is shown in FIGS. 8 and 9. These states are hereinafter denoted as a "first state" and "second state".

FIG. 8 shows the system 30 in the first state. In the first state, the first closure slide 2*a* is situated in a closure position and the second closure slide 2*b* in a release position. The first access element 5*a* is closed by the first closure slide 2*a*. The unlocking element opening 14 is located over the second access element opening 5*b* and together with this provides an access to the second particle capture volume 4*b*.

FIG. 9 shows the system 30 in a second state. In the second state, the first closure slide 2*a* is situated in a release position and the second closure slide 2*b* in a closure position. The unlocking element opening 14 is located over the first access element opening 5*a* and together with this provides an access to the first particle capture volume 4*a*. The second access element opening 5*b* is closed by the second closure slide 2*b*.

In particular, the system is designed such that the system 30 in every possible displacement position of the closure slides 2*a*, 2*b* is situated in a state in which each of the access element openings 5*a*, 5*b* is either closed or together with the unlocking element opening 14 provides the access to the respective particle capture volume 4*a*, 4*b*. In particular, this applies to the displacement position of the closure slides 2*a*, 2*b* in the first state, in the second state and in any possible displacement position therebetween. As a result, a contact of one of the access element openings 5*a*, 5*b* with the environment of the system 30 cannot occur, so that in this manner the risk of a contamination can be further reduced.

By way of example, the system 30 comprises a particle source 15, for example a suction head and/or a cyclone device, as well as a particle conduit 16, for example a flexible tube, which connects the particle source 15 to the unlocking element opening 14. Furthermore, the system 30 by way of example comprises two particle capture volumes 4a and 4b which for example represent the inner volumes of two bags, in particular disposal sacks or filter sacks, and/or containers, in particular disposal containers.

The cyclone device is operated for example as a separating preliminary stage and is expediently arranged in front of a further separator device, for example in front of a suction apparatus, in particular a vacuum cleaner.

On operation, it is therefore in particular possible to change from one particle capture volume 4a, 4b to the other particle capture volume 4a, 4b without a region which is contaminated by particles—thus in particular the two particle capture volumes 4a, 4b, the access element openings 5a, 5b, the unlocking element opening 14 and/or the inner volume of the particle conduit 16—being herein opened with respect to the environment of the system 30. For example, one can a firstly begin with the position which is shown in FIG. 8 and particles which are fed via the particle conduit 16 can be collected in the second particle capture volume 4b.

If for example the second particle capture volume 4b is full, then the subassembly of the first closure slide 2a, the unlocking element 3 and the second closure slide 2b can be displaced so that the system 30 is brought into the position which is shown in FIG. 9. In this position, the particles which are fed from the particle conduit 16 are then transported into the first particle capture volume 4a.

According to a further embodiment which is not shown, a suction apparatus which comprises the system 30, the closure device 10 and/or the closure device 20 is provided. The suction apparatus is preferably a suctioning facility, for example a stationary suctioning facility or mobile suction apparatus. The suction apparatus serves for sucking particles, for example dust and building debris.

The invention claimed is:

1. A system comprising:
a closure device for closing a particle capture volume, the closure device comprising an access element with an access element opening for providing an access to the particle capture volume,
a closure slide which is selectively displaceable relative to the access element into a release position or into a closure position, wherein in the release position the closure slide releases the access element opening and in the closure position closes the access element opening,
a locking mechanism for locking the closure slide in the closure position with respect to the access element; and
an unlocking element, the unlocking element being separate from the locking mechanism,
wherein, for unlocking, the locking mechanism requires the unlocking element separate from the locking mechanism.

2. The system according to claim 1, wherein the unlocking element is attachable to the closure slide and in the attached state is movable together with the closure slide relative to the access element.

3. The system according to claim 1, wherein the unlocking element comprises an unlocking element opening which, in a state in which the unlocking element is attached to the closure slide and the closure slide is situated in the release position, is located over the access element opening, so that the access element opening and the unlocking element opening together provide the access to the particle capture volume.

4. The system according to claim 3, wherein in a state in which the unlocking element is attached to the closure slide, the closure slide is exclusively displaceable between the release position and the closure position, wherein the closure device in every possible displacement position of the closure slide is situated in a state in which the access element opening is either closed or together with the unlocking element opening provides the access to the particle capture volume.

5. The system according to claim 1, wherein the locking mechanism comprises a through-hole which is arranged in the closure slide and a latching element which is arranged on the access element and which in the closure position engages into the through-hole and hence locks the closure slide in the closure position.

6. The system according to claim 5, wherein the through-hole and/or the latching element is designed such that in the closure position the latching element which engages into the through hole cannot be actuated merely by hand, so that, for unlocking the locking mechanism, an unlocking element with a shape element which can be inserted into the through-hole, is necessary.

7. The system according to claim 1, further comprising a guide device which is designed to guide the unlocking element in a state attached to the closure slide, relative to the access element and to permit a removal of the unlocking element only in the closure position.

8. The system according to claim 1 wherein in a state in which the unlocking element is attached to the closure slide and the closure slide is situated in the release position, the closure slide lies with a lateral end region on the access element, so that the closure slide cannot be removed from the unlocking element in this state.

9. The system according to claim 1, wherein the unlocking element comprises on two opposite sides a respective shape element so that it is simultaneously attachable to two closure slides.

10. The system according to claim 1, wherein the unlocking element is a part which is provided separately from the closure slide and/or from the access element.

11. The system according to claim 1, wherein, for the unlocking, the locking mechanism is configured to be unlocked by the unlocking element that is separate from the locking mechanism.

\* \* \* \* \*